United States Patent [19]

Dorner et al.

[11] 4,036,700

[45] July 19, 1977

[54] NUCLEAR REACTOR INSTALLATION

[75] Inventors: Heinrich Dorner; Axel Jungmann; Manfred Scholz, all of Erlangen, Germany

[73] Assignee: Siemens Aktiengesellschaft, Munich, Germany

[21] Appl. No.: 486,645

[22] Filed: July 8, 1974

[30] Foreign Application Priority Data

July 9, 1973 Germany .................... 2334773

[51] Int. Cl.² ............................................ G21C 13/04
[52] U.S. Cl. ...................................... 176/87; 176/38; 52/224; 52/248
[58] Field of Search .................... 176/87, 38; 52/224, 52/248

[56] References Cited

U.S. PATENT DOCUMENTS

| 3,898,126 | 8/1975 | Dorner ........................... 176/87 |
| 3,899,393 | 8/1975 | Dorner et al. .................. 176/87 |
| 3,928,133 | 12/1975 | Schabert et al. ............... 176/87 |

Primary Examiner—Peter A. Nelson
Attorney, Agent, or Firm—Kenyon & Kenyon Reilly Carr & Chapin

[57] ABSTRACT

A nuclear reactor installation includes a pressurized-water reactor pressure vessel positioned in a reinforced-concrete structure forming a wall surrounding the pressure vessel and forming an annular space around the pressure vessel, this space containing a layer of discrete elements such as gravel, ceramic bodies, steel balls, etc. This layer directly contacts the concrete wall, possibly through a steel sheet or plate skin and between it and the pressure vessel, a thermally-insulating and pressure-resistant encasement is built from separable segments cast from suitable concrete, a steel sheet or plate skin preferably being interposed between the layer of discrete elements and this encasement, the discrete elements being compacted so that radial force transmitted from the pressure vessel via the encasement is transmitted through the discrete elements to the concrete wall formed by the reinforced-concrete structure. The encasement, layer and skin interposed between them provide via their total thickness, for zero-travel restraint of the pressure vessel in its radial direction, via the concrete structure's wall, when these parts and the pressure vessel are thermally expanded during operation of the reactor. When the reactor is shut down and it and the various parts are cold, the layer of discrete particles and the skin between them and the encasement, are proportioned so that with thermal contraction the skin is free from the encasement, and the latter, being made of separable segments, may be removed segment-by-segment.

8 Claims, 3 Drawing Figures

NUCLEAR REACTOR INSTALLATION

BACKGROUND OF THE INVENTION

This invention is particularly concerned with a nuclear reactor installation using a pressurized-water reactor, its pressure vessel being surrounded by a concrete wall formed by a reinforced-concrete structure, provided for containment of the vessel in the event its side wall ruptures, as well as for biological reasons.

The Dorner et al U.S. Pat. application Ser. No. 315,932, filed Dec. 18, 1972, on which U.S. Pat. 3,898,126 issued Aug. 5, 1975, discloses a nuclear reactor installation of the above general type but with the pressure vessel's side wall surrounded by a layer of insulating concrete with a layer of steel balls or spheres of ceramic material or other spherical filler bodies positioned between this layer of insulating concrete and the pressure vessel's side wall. The layer of insulating concrete engages the concrete wall provided by a reinforced-concrete structure, and the radial force from the vessel's side wall is transmitted to this concrete wall via the two layers, a sheet metal lining being interposed between the two layers. The reinforced-concrete structure has its wall contacted by the thermally insulating concrete layer, provided with a cooling system.

The purpose of the above construction is to provide a containment of the pressure vessel's side wall in the event it ruptures, the cooling system of the concrete structure relieving the latter from excessive thermal stressing and, the reactor being promptly scrammed in the event of such an accident, to allow time for removing the residual and decay heat from the core via the usual emergency core cooling system. However, the invention of the above application specifically concerns restraint of the intercept ring on the cover of the pressure vessel, which is done via a special design of hooks, the concrete structure being vertically reinforced to carry the tension of the hooks should they be needed to hold down the intercept ring.

Again in the case of a pressurized-water reactor installation, the Michel U.S. application Ser. No. 464,238, filed Apr. 25, 1974, describes a construction wherein the pressure vessel is encased by plural layers of separable concrete segments held against radial force from the pressure vessel's wall by high tensile steel cylinders, relieving the concrete wall formed by the concrete structure, from being stressed by such force. The proportions of the parts are such that when the vessel is in operation its radial expansion is resisted by the steel cylinders so that the encasement is placed under compression, and when the reactor is cold, this compression is relieved so that the encasement's segments may be removed for inspection of the pressure vessel's side wall.

SUMMARY OF THE INVENTION

The object of this invention is to improve on the cooling system of the concrete structure's wall provided by the installation with which the previously referred to Dorner et al patent application is concerned, while providing for inspection of the pressure vessel's side wall by permitting adequate clearance of the annular space formed around the vessel's side wall by the concrete wall of the concrete construction as is featured by the installation disclosed by the previously mentioned Michel application.

This object is attained by interposing a thermally-insulating and pressure-resistant encasement between the layer of discrete elements and the pressure vessel's side wall. The layer of discrete elements is positioned to press against the concrete wall of the concrete construction when receiving radial force transmitted to this layer from the pressure vessel's side wall via the encasement. The layer of discrete elements is compacted to carry the force, but even so, remains permeable to fluids and particularly to gases, as exemplified by air. Advantage is taken of this to inject a fluid coolant into the bottom of the layer of discrete elements for upward flow therethrough and cooling of the layer, this cooling being particularly effective because of the temperature drop provided by the thermally-insulating encasement through which the heat must flow to the layer of discrete elements from the reactor. The layer and encasement are proportioned so that when the pressure vessel thermally expands radially, the encasement and layer also expanding, the pressure vessel's side wall is provided with zero-travel containment, the pressure vessel being constricted by the reaction of the concrete wall of the concrete construction, transmitted via the layer of compacted discrete particles and the encasement which is pressure-resistant.

The encasement is formed from separable segments which may be cast from a suitable concrete and they are preferably individually encased by sheet steel. Preferably a sheet steel or plate skin is interposed between the layer and encasement so that when the discrete particles are compacted, they are prevented from flowing between the various segments of the encasement. This skin also functions to guide the cooling fluid along accurate paths and to retain the layer of particles in position at all times. Therefore, by proportioning the layer and encasement as to thickness, relative to the thermal expansion and contraction of the pressure vessel's side wall, this installation may be designed so that when the reactor is shut down and all of the parts are thermally contracted, the encasement's separable segments between the layer and the vessel's side wall, are loose and can be removed segment-by-segment to provide a cleared annular space around the vessel's side wall and permitting its inspection. Under such conditions, the skin between the layer and encasement, which may be made of steel thick enough for rigidity, holds the layer of particles in position. Replacement of the segments rebuilds the encasement and returns the installation to operative condition permitting the reactor to be returned to operation.

BRIEF DESCRIPTION OF THE DRAWINGS

The presently preferred mode for carrying out the invention is illustrated by the accompanying drawings, in which.

DETAILED DESCRIPTION OF THE INVENTION

Figure 1:
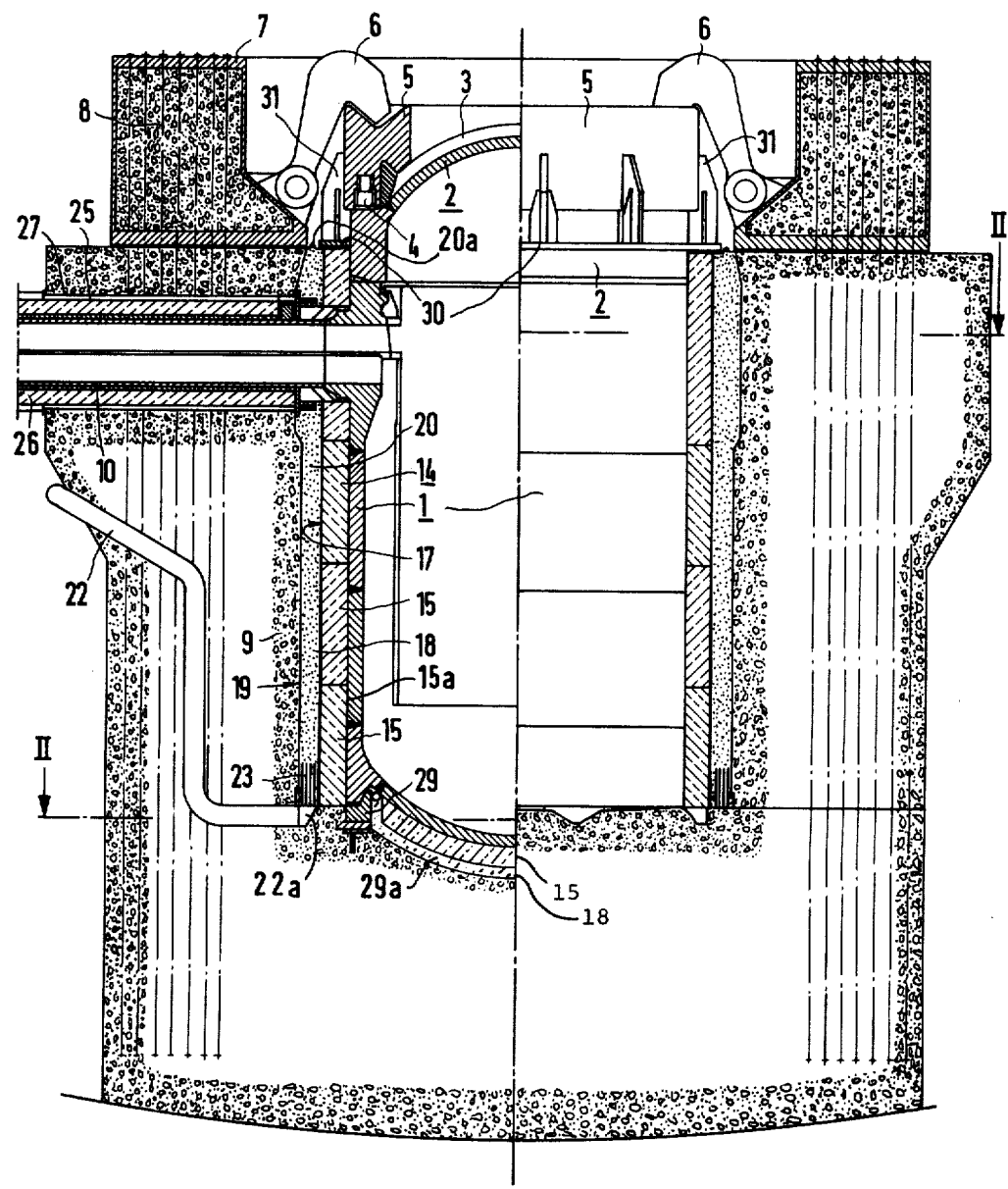
FIG. 1 shows a pressurized-water reactor pressure vessel installation in vertical section on the left-hand side of the centerline, but showing the reactor pressure vessel's side wall and certain other parts in elevation on the right-hand side.

A 1,000 MWe pressurized-water reactor is illustrated by the above drawings, the present invention being, of course, applicable to reactors having other capacities.

Its pressure vessel has a fabricated steel substantially cylindrical side wall 1, vertically positioned, the vessel having a steel cover 2 downwardly contained by a steel intercept lid 3 which extends radially to a peripheral location adjacent to the studs 4 which removably fasten the cover 2 to the side wall 1. The lid 3, and therefore the cover 2, are provided with a steel intercept ring 5 held by the steel hooks 6 hinged to a concrete-filled case 7 anchored downwardly by steel tension rods 8 which extend down through the concrete construction 9 of the installation. Two-channel cooling pipes 10 extend from the upper portion of the wall 1 to the steam generators (not shown) each of the pipes 10 functioning as a main coolant loop including not only the steam generators, but the main coolant pumps (not shown). The details of these and of the internal connections of the pipes 10 with the interior of the pressure vessel, are not needed to understand the present invention.

The outside of the pressure vessel wall 1 is surrounded by the encasement 14 made up of separable segments 15 which are segmentally cylindrical segments interfitted to form the encasement. Each segment is made of thermally-insulating and pressure-resistant material, an example being Leca concrete having a specific gravity of about 1.75 kg/liter. Each segment is entirely clad with sheet metal 15a so that it may be handled individually with convenience. The entire encasement 14 is surrounded on its outside facing away from the pressure vessel 1, by a skin 17 made of individual overlapping steel sheets or plates secured individually to the concrete construction gas by anchors (not shown). This skin 17 is proportioned so that when the vessel's wall 1 is cold, the encasement 14 is free from compression by the skin 17, and when the pressure vessel wall 1 thermally expands due to reactor operation, the skin 17 holds the interfitted segments 15 of the encasement 14 tightly against the outside of the vessel's wall 1.

The skin 17 is so dimensioned in its stiffness and held by the anchors in place, that it remains form-stable during the compacting procedure of the layer 20.

This skin 17 defines an annular space 18 between the outside of this skin and the inside 19 of the concrete wall formed by the concrete construction 9. It is in this annular space 18 that the discrete elements are positioned and firmly compacted, these elements being gravel, ceramic bodies, steel balls and the like. They should have such a shape as to make the layer of elements 20 fluid-pervious or porous. They should not have shapes which interfit and leave no voids. The compacting or densification may be by tamping, and although not shown, means may be used at the top of the layer 20 to maintain the discrete elements under continuous compression. In any event, the layer 20 should be rigid to compression so as to transmit the radially outward force received by the skin 17 to the inside wall 19 of the concrete construction 9.

For cooling, a compressed air inlet duct 22 is connected to a source of compressed air (not shown), this duct 22 connecting with a peripheral manifold space 22a extending around the bottom end of the fluid-permeable layer 20, this bottom end being provided with an air flow distributor 23 designed to cause the air to flow upwardly and circumferentially uniformly through the layer 20. Each of the reactor coolant pipes 10 extends radially from the vessel's wall 1, horizontally through a hole 25 formed in the concrete construction 9, and is surrounded by a cover 26 made of thermally-insulating material, the inside diameter of the hole 25 and the outside diameter of the covering 26 being proportioned to form an annular space 27 which at its inner end connects with the layer 20. The top end of the layer 20 is provided with a sealing diaphragm 20a which forces the upward air flow through the layer 20 to exit via the annular space 27. The segments 15 forming the encasement 14 are separable as previously indicated, and therefore, if the vessel's wall 1 ruptures and releases the pressurized-water coolant, if not prevented by additional means, it might be possible to forcibly displace the segments 15 upwardly regardless of the radial compression they are under during operation of the reactor. Therefore, to prevent this, onto the top of the encasement 14, a horizontal ring 30 engages the entire top peripheral extent of the encasement 14, this ring 30 being held downwardly by columns 31 which are fixed to the intercept ring 5 and are constructed to be individually rigid against bending. This positively prevents upward displacement of the components of the encasement 14 in the event the pressurized coolant is released by a rupture of the vessel's wall 1. The bottom of the encasement 14 is supported against downward movement by a portion of the concrete construction 9 which extends under the pressure vessel.

Figure 2:
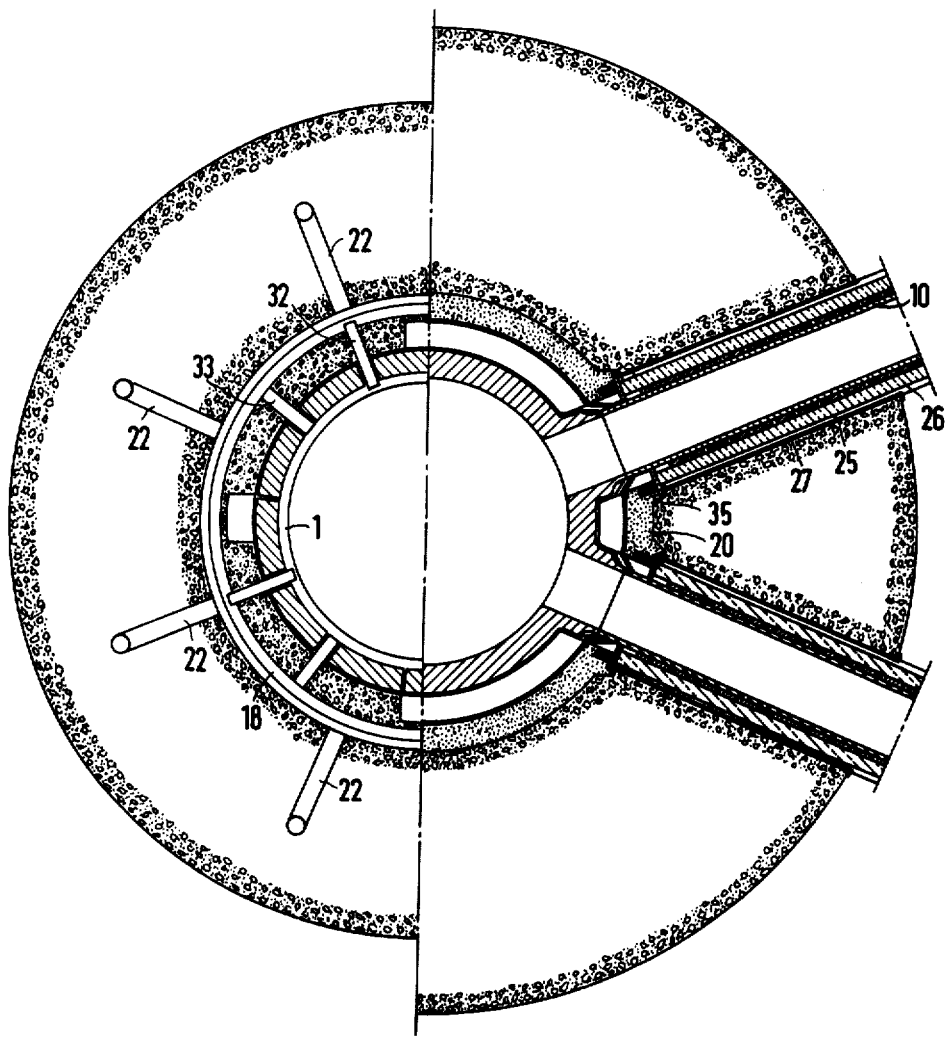
FIG. 2 is a cross section taken on the line II—II in FIG. 1.

As shown by FIG. 2, the duct 22 is one of a multiplicity of ducts, eight for example, which are circumferentially interspaced uniformly, which extend from the outside of the concrete construction and through the latter to the bottom of the fluid-pervious layer 18. The bottom of the pressure vessel is held up by a ring-shaped steel support 29 resting on the concrete construction and separate air supply pipes 32 are extended through this support into a space 29a filled up by the discrete elements and formed below the bottom of the pressure vessel; after washing over the bottom of the pressure vessel, the cooling air escapes through air discharge pipes 33 back into the bottom end of the layer 20 of discrete particles compacted in the annular space 18 between the skin 17 and the inside 19 of the surrounding concrete wall. As shown by the right-hand side of FIG. 2, the annular space 27 formed between the concrete wall forming the hole 25 is connected by multiply-perforated pipe sections 35 to the stream of cooling air rising through the layer 20. These pipe sections 35 protrude into the discrete particles 20.

Figure 3:
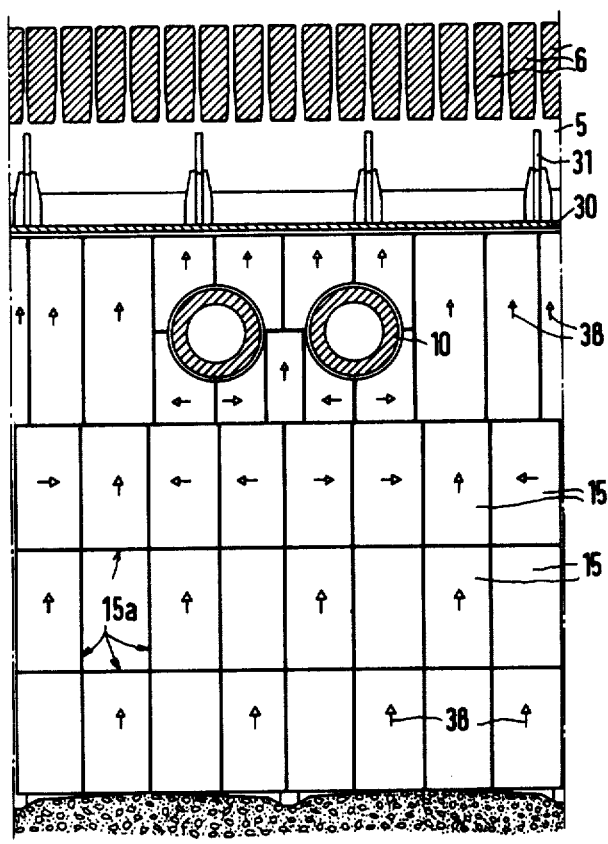
FIG. 3 is a development of the encasement indicating the manner in which its segments may be removed for inspection of the vessel's side wall.

The development of FIG. 3 indicates how the individual segmentally cylindrical segments 15 of the encasement 14 can be removed by a shuffling procedure from the space between the skin 17 and the outside of the vessel's wall 1 when the reactor is shut down and cold, so that these segments are free from compression. Being encased by sheet metal, they can be handled individually as units, without difficulty, the arrows in FIG. 3 indicating the shuffling direction, particularly as required for removal of the segments below the pipes 10. The arrows referred to are indicated at 38.

It can be seen that when the installation is cold, the thickness of the layer 20 and encasement 14, and the diameter of the steel skin 17 can be easily proportioned relative to their thermal expansion and contraction and that of the vessel's wall 1, to leave the segments 15 free from radial compression. When the reactor is shut down, its cover 2, intercept lid 3 and intercept ring 5 are commonly removed, as during core refueling for example, this meaning that the annular retaining ring 30 is removed from the top of the encasement 14. At that time via the shuffling procedure of FIG. 3, the encasement 14 can be removed partially or entirely — if necessary — to provide a large enough cleared space axially and/or circumferentially around the outside of the vessel's wall 1 to permit its easy inspection in the usual manner. The skin 17 prevents displacement of the discrete particles forming the layer 20, at this time. Rebuilding of the encasement 14 and the return of the cover 2, lid 3 and intercept ring 5, the hooks 6 being of course, disengaged but being then returned to engage the intercept ring 5, readies the installation for a re-start of the reactor, it being assumed that refueling and other servicing has been completed.

Since the vessel's wall 1 is provided with substantially zero-travel restraint or containment, i.e. no gap or a minimum gap, and if the wall 1 ruptures, there is practically no space through which wall fragments can gain momentum or acquire a high velocity.

The cooling action is important, because the thermally-insulating encasement 14 drops the temperature of the heat transmitted from the vessel's wall 1 to the layer 20 formed from the discrete particles and up through which the cooling air introduced by the ducts 22, flows for discharge at the top of the layer 20 via the spaces 27 formed around the coolant pipe's thermally-insulating coverings 26. The embodiment has further as an advantage that in case of leakage, pressurized coolant could escape, but its heat in the outward direction would be reduced by the thermally-insulating encasement 14, thus functioning as a heat-resistant shield.

During normal reactor operation, relatively small amounts of heat reach the concrete construction 9 because of the temperature gradiant effected by the thermally-insulating encasement 14 and the cooling action of the air coolant constantly passing upwardly through the fluid previous layer 20, the vessel's wall 1 being at all times positively restrained by substantially play-zero.

What is claimed is:

1. A nuclear reactor installation comprising a metal pressure vessel having a vertical side wall, a reinforced-concrete wall surrounding said side wall and forming an annular space around said side wall, and a fluid-permeable layer of discrete particles surrounding said side wall and compacted in said space to transmit radial force from said side wall to said concrete wall, a thermally insulating and pressure-resistant encasement surrounding and normally engaging said side wall between the latter and said layer, and means for flowing a fluid coolant through said layer.

2. The installation of claim 1 in which said encasement is formed by interfitted concrete segments, said segments being clad by steel sheet layers.

3. The installation of claim 1, wherein the space containing the fluid-permeable layer is provided at its reactor-vessel facing side with a sheet metal skin comprising sheets overlapping one another, said skin being supported by anchor elements fastened to the reinforced concrete wall.

4. The installation of claim 1 in which said discrete elements are compacted to transmit to said concrete wall said radial force when received from said side wall via said encasement.

5. The installation of claim 3 in which said encasement is formed by separably interfitted segmentally-cylindrical segments made of concrete, said sheet metal skin being interposed between said discrete elements and said encasement, and said discrete elements are compacted to firmly transmit to said concrete wall said radial force when received from said side wall via said encasement and skin.

6. The installation of claim 5 in which said encasement and said layer and skin are proportioned relative to the thermal expansion and contraction of said vessel's said side wall so that said segments are loose when said vessel's said side wall is cold, so that said segments may be removed from said space, and when said vessel's said side wall is at the reactor operation temperature, to completely fill said space radially and provide substantially zero-travel restraint for said side wall of said vessel.

7. The installation of claim 6 having means for supporting the bottom end of said encasement and means for releasably holding down the top end of said encasement during reactor operation.

8. The installation of claim 7, wherein said means for releasably holding down the top end of said encasement is comprising a horizontal ring, said ring in turn being held in position by supporting columns being connected to an intercept ring.

* * * * *